United States Patent
Mohan et al.

(10) Patent No.: US 11,570,238 B2
(45) Date of Patent: Jan. 31, 2023

(54) SYSTEM AND METHOD FOR PREDICTING THE STATE CHANGES OF NETWORK NODES

(71) Applicant: Telefonaktiebolaget LM Ericsson (publ), Stockholm (SE)

(72) Inventors: Saravanan Mohan, Chennai (IN); Arindam Banerjee, Howrah (IN); Perepu Satheesh Kumar, Chennai (IN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/956,277

(22) PCT Filed: Dec. 22, 2017

(86) PCT No.: PCT/IN2017/050611
§ 371 (c)(1),
(2) Date: Jun. 19, 2020

(87) PCT Pub. No.: WO2019/123471
PCT Pub. Date: Jun. 27, 2019

(65) Prior Publication Data
US 2020/0336536 A1    Oct. 22, 2020

(51) Int. Cl.
*G06F 15/173* (2006.01)
*H04L 67/1012* (2022.01)
(Continued)

(52) U.S. Cl.
CPC ...... *H04L 67/1012* (2013.01); *H04L 67/1008* (2013.01); *H04L 67/1029* (2013.01)

(58) Field of Classification Search
CPC ............ H04L 67/1012; H04L 67/1008; H04L 67/1029
(Continued)

(56) References Cited

U.S. PATENT DOCUMENTS 6,633,852 B1   10/2003   Heckerman et al.
6,928,459 B1 *  8/2005   Sawdon .................. G06F 16/10
(Continued)

FOREIGN PATENT DOCUMENTS

CN   103106279 A   5/2013
CN   104361531 A   2/2015
(Continued)

OTHER PUBLICATIONS

International Search Report and Written Opinion dated Mar. 13, 2018 issued in International Application No. PCT/IN2017/050611. (7 pages).
(Continued)

*Primary Examiner* — Alicia Baturay
(74) *Attorney, Agent, or Firm* — Rothwell, Figg, Ernst & Manbeck, P.C.

(57) ABSTRACT

In one aspect, a method performed by a network node for predicting a probability of state change of a node (e.g., a fog node) in a network is provided. The network node determines a set of weights based on attributes of the node. The network node estimates the probability of state change of the node using the determined set of weights and a set of one or more attribute values related to the node where determining the set of weights includes maximizing an evaluation value associated to the node.

19 Claims, 7 Drawing Sheets

(51) Int. Cl.
*H04L 67/1008* (2022.01)
*H04L 67/1029* (2022.01)

(58) Field of Classification Search
USPC .......................................................... 709/226
See application file for complete search history.

(56) References Cited

U.S. PATENT DOCUMENTS

| | | | |
|---|---|---|---|
| 8,171,134 B2* | 5/2012 | Chen | H04L 41/147 |
| | | | 709/224 |
| 9,912,683 B2* | 3/2018 | Cam | H04L 63/1433 |
| 10,742,750 B2* | 8/2020 | Johnson, II | H04L 67/146 |
| 10,853,143 B2* | 12/2020 | Schiff | G06F 8/61 |
| 11,132,430 B2* | 9/2021 | Xiong | H04W 12/068 |
| 2007/0101202 A1 | 5/2007 | Garbow | |
| 2009/0132864 A1 | 5/2009 | Garbow | |
| 2010/0238814 A1 | 9/2010 | Chen et al. | |
| 2016/0248794 A1 | 8/2016 | Cam | |
| 2017/0230297 A1 | 8/2017 | Park et al. | |
| 2019/0079898 A1* | 3/2019 | Xiong | G06F 9/5072 |
| 2019/0377765 A1* | 12/2019 | Guo | G06F 16/986 |
| 2021/0234775 A1* | 7/2021 | Devadoss | H04L 43/087 |
| 2021/0234786 A1* | 7/2021 | Devadoss | H04L 43/087 |
| 2021/0234804 A1* | 7/2021 | Devadoss | H04L 47/805 |
| 2021/0234805 A1* | 7/2021 | Devadoss | H04L 45/50 |
| 2021/0235313 A1* | 7/2021 | Devadoss | H04L 45/70 |

FOREIGN PATENT DOCUMENTS

| | | |
|---|---|---|
| CN | 105764162 A | 7/2016 |
| WO | 2015/130645 A1 | 9/2015 |

OTHER PUBLICATIONS

Khanasin Yamnual et al., "Failure Detection through Monitoring of the Scientific Distributed System", 2017 International Conference on Applied System Innovation (ICASI), IEEE, May 13, 2017 (pp. 568-571).

Mehdi Mohammadi et al., "Deep Learning for IoT Big Data and Streaming Analytics: A Survey", Cornell University Library, Dec. 9, 2017 (40 pages).

* cited by examiner

500A

| State | Predicted | |
|---|---|---|
|  | Inactive | active |
| Inactive | 161 | 21 |
| active | 39 | 5779 |

| Actual | Predicted | |
|---|---|---|
|  | Inactive | Active |
| Inactive | 132 | 83 |
| Active | 48 | 2205 |

| Method | F-measure | ROC |
|---|---|---|
| Proposed | 0.85 | 0.93 |
| Existing method (SVM) | 0.42 | 0.63 |

FIG. 5C

SYSTEM AND METHOD FOR PREDICTING THE STATE CHANGES OF NETWORK NODES

CROSS REFERENCE TO RELATED APPLICATION(S)

This application is a 35 U.S.C. § 371 National Stage of International Patent Application No. PCT/IN2017/050611, filed Dec. 22, 2017, designating the United States.

TECHNICAL FIELD

Disclosed are embodiments related to predicting the state changes of network nodes in a network, such as, for example a fog node.

BACKGROUND

Recently, there has been a rapid expansion of Internet of Things (IoT) devices to support both industrial and commercial applications. Cloud computing is an important paradigm in the IoT framework. To enable the new breed of applications and services involving IoT devices, researchers have introduced fog computing which extends cloud computing to the edge of a network.

Fog computing will benefit several relevant domains, including mobile/wearable computing, Internet of Things (IoT), and big data analytics by reducing latency, increasing throughput, consolidating resources, saving energy, and enhancing security and privacy. In big data analytics, huge volumes of data are generated at the edge of network. Fog computing supports edge analytics, which can reduce the delay of big data analytics and decrease the cost of data transmission and storage. In IoT applications, a specific device which has connections to one or more sensors with a built-in intelligent module can act as a fog node. The fog node may also be a collection of different sensors which has unique sensing and actuation abilities. The fog node may include a built-in database and analytics module which facilitates the activation and decision making of the fog node. Such fog nodes may be located in remote locations, such as mountains or in the middle of the ocean. In such remote locations, a fog node has to sustain on its own battery power and maintain functionality despite climatic changes. Hence, fog nodes need to be monitored on a continuous basis to anticipate and prepare for timely state changes. For example, in case a fog node suddenly goes into an inactive state due to internal issues or due to external issues (e.g., climatic conditions), there is a possibility of missing the specific location of the fog node and other important related details which may create a serious problem in the entire network.

SUMMARY

Generally, fog nodes are connected to a cloud to establish fog networking. Accordingly, fog nodes transmit information to the cloud periodically (e.g., transfers the details in a timely manner), so a sudden failure of a fog node may result in a loss of crucial data. In this respect, there is a need to monitor the fog nodes in real time to anticipate and understand the dynamic state changes of the fog nodes.

Additionally, increasingly more processing and decision making for businesses is happening at the edge of the network (i.e. in fog nodes). Accordingly, there is a need to continuously account for the state of the fog node and keep the fog node intact for all business related transactions. For example, if the state of a fog node changes to an inactive mode, then the business may need to standstill for a period of time and resume after the fog node changes back to an active mode. Thus, predicting the behavior and understanding the reason for critical state changes of a fog node is an important problem to address in the midst of the recent technology transformation.

Another interesting characteristic of the fog node is that not only can the geo-distributed fog node infer its own location, but the fog node can also track end user devices to support mobility. This may have significant implications for location-based services and applications. Hence tracking the fog node, including its location, in a continuous manner is considered to be an interesting issue. At present, a fog node can communicate with another fog node or clouds at certain periods of time. The length of the periods of time may vary depending on the importance of the fog node and/or the data being transmitted by the fog node. In short, the above clearly indicates the importance of fog computing and the continuous observation of the current state of fog nodes. Thus, any unexpected state changes of a fog node in a fog network may cause a problem in a specific location.

In fog networking, each node (e.g., each fog node) should be able to function as a router for nearby nodes and be able to maintain functionality in order to understand the mobility and detect sudden changes in the state of the node and the nearby nodes. Some of the disclosed embodiments address how to deal with sudden changes in fog nodes in the fog network. There currently exists several proposed data mining techniques to predict potential customers that are most likely to churn, i.e. predict permanent state change. Such data mining techniques include clustering, associations, rule induction, genetic algorithm, decision tree, and neural network. Applying such data mining techniques to predict the state changes of a fog node in a fog network may be problematic. For example, inherent characteristics of the fog network such as: a) low latency and location awareness; b) wide-spread geographical distribution; c) mobility; d) very large number of nodes in close proximity; e) predominant role of wireless access; f) strong presence of streaming and real-time applications; and g) heterogeneity will complicate the challenges of finding the state changes of the fog node in the network using the above mentioned data mining techniques. Hence general churn and state change prediction algorithms will not work to find a fog node which has gone missing from the network or which has suddenly become inactive or predict which fog nodes may be inactive during a next period (e.g., time or season).

Some aspects of the disclosed embodiments take into consideration the fact that a fog node may be a collective device of various sensors with unique features. Understanding the different sensor functions and its relationship with other sensors within the fog node is quite challenging. In some instances, the failure of one of the sensors may lead to a state change of the fog node. It is worth noting that state changes in a fog node is a rare event phenomena when compared with all other different types of churnings, for example customer churning, employee churning, among others. More specifically, the probability of one sensor malfunctioning in a wireless network comprising 10,000 sensors is less than 0.1%. Hence, the disclosed embodiments address this rare event phenomena, i.e., the failure of a sensor in a fog node (e.g., internal changes), by adjusting the probability in a prediction model.

Some aspects of the disclosed embodiments take into consideration the fact that the fog node can be affected by a surrounding environment. For example, fogs placed in an ocean for monitoring can be washed away by currents. Hence, some aspects of the disclosed embodiments predict the state of such fog nodes due to change in the climatic conditions (e.g., external changes).

Some aspects of the disclosed embodiments allow a user to be alerted about the state of a fog node, for example an impending state change, by considering the reasons due to: (i) internal changes and (ii) external changes.

In some aspects of the current disclosure, there is a method performed by a network node to understand the state of fog nodes on a real-time basis and predict the state changes of the relevant fog nodes based on its inherent features of various sensors connected to each of the fog nodes. The state change prediction of the relevant fog nodes is not based on the decision of any one sensor.

The solution, as described by some aspects of the current disclosure, provide: 1) running a new Learning Model with newly induced features to determine the real state of various sensors attached to the fog nodes; 2) predicting, based on the state of sensors and other parameter values, probable state changes of the fog nodes to alert the centralized system to perform a preventive measure; and 3) adapting a F-measure based rose sampling approach for training purposes in order to solve the inherent imbalance issue attached to this type of state change problem.

According to some of the disclosed embodiments, a method implemented in a network node is provided. The method for predicting a probability of state change of a node in a network includes determining a set of weights based on attributes of the node. In some embodiments, determining the set of weights comprises maximizing an evaluation value associated to the node. In some embodiments, maximizing the evaluation value associated to the node may comprise maximizing a f-measure of a specific classifier.

In some embodiments, the f-measure is defined as:

$$f\text{-measure}=2*T_p(w)/N_p+M_p(w),$$

where $N_p$ is a total number of actual positive samples, $M_p(w)$ is a total number of samples predicted to be positive (e.g, predicted positive), and $T_p(w)$ is a number of actual positive samples out of the predicted positive, and where a positive sample corresponds to the node in an operating state (e.g., $y=1$) and a negative sample corresponds to the node in a non-operating state (e.g., $y=0$).

In some embodiments, $T_p(w)$ is defined as:

$$T_p(w) = \sum_{i=1}^{N} h(w^T x_i),$$

where $T_p(w)$ only considers the number of actual positive samples (e.g., $y_i=1$) out of the predicted positive.

In some embodiments, $M_p(w)$ is defined as:

$$M_p(w) = \sum_{i=1}^{N} h(w^T x_i),$$

where $M_p(w)$ considers the number of actual positive samples (e.g., $y_i=1$) out of the predicted positive and a number of negative samples (e.g., $y_i=0$) out of the predicted positive.

In some embodiments, the f-measure is maximized by calculating a derivative of the f-measure and equating the derivative of the f-measure to zero. The f-measure may be maximized by employing a gradient descent algorithm based on the derivative of the f-measure to determine the set of weights. In some embodiments, the derivative of the f-measure may comprise a derivative of the $T_p(w)$ and a derivative of the $M_p(w)$.

In some embodiments, the derivative of the $T_p(w)$ is defined as:

$$\frac{\partial T_p(w)}{\partial w_j} = \sum_{i=1, y=1}^{N} h'\left(\sum_i w_i x_i\right) x_{i,j}.$$

In some embodiments, the derivative of the $M_p(w)$ is defined as:

$$\frac{\partial M_p(w)}{\partial w_j} = \sum_{i=1}^{N} h'\left(\sum_i w_i x_i\right) x_{i,j}.$$

In some embodiments, the function h(z) is defined as:

$$h(z) = \begin{cases} 0 & z < -1 \\ 0.5(1+z)^2 & -1 \leq z \leq 0 \\ 0.5(2-(1-z)^2) & 0 < z \leq 1 \\ 1 & z > 1 \end{cases},$$

where z is a real number.

The method may further include estimating the probability of state change of the node using the determined set of weights and a set of one or more attribute values related to the node. In some embodiments, using the determined set of weights and the set of one or more attribute values comprises applying each weight of the determined set of weights to a corresponding attribute value of the set of one or more attribute values.

In some embodiments, the process may have an additional step where the network node determines the set of one or more attribute values based on a first set of one or more internal attribute values and a second set of one or more external attribute values. In some embodiments, the set of one or more attribute values may be determined by the network node obtaining the first set of one or more internal attribute values and the second set of one or more external attribute values; employing an attribute selection algorithm based on the received first set of one or more internal attribute values and the second set of one or more external attribute values; and determining the set of one or more attribute values based on the attribute selection algorithm. In some embodiments, the attribute selection algorithm is a least one of a decision tree algorithm, a random forest algorithm, a support vector machine algorithm, and a least absolute shrinkage and selection operator (LASSO) algorithm.

In some embodiments, the method may further include determining a plurality of probability levels for the predicted probability of state change of the node. In some embodiments, a first probability level indicates a low risk of state change of the node, a second probability level indicates a medium risk of state change of the node, and a third probability level indicates a high risk of state change of the node.

In some embodiments, the node may be a fog node. In some embodiments, a prediction model may be used to predict the probability of state change of the node. In some embodiments, the prediction model to predict the probability of state change of the node is built using deep learning neural network.

One advantage of some of the disclosed embodiments is that a great change in maintaining connected devices in an industrial IoT scenario may be implemented without any disruption in the current networks.

Another advantage of some of the disclosed embodiments is the easy extension of use in consumer IoT in smart home or smart city environment in maintaining the devices and not losing any data for analysis.

Another advantage of some of the disclosed embodiments is the undisturbed setup of the fog nodes in a fog network even during natural calamity.

BRIEF DESCRIPTION OF THE DRAWINGS

The accompanying drawings, which are incorporated herein and form part of the specification, illustrate various embodiments.

FIG. 5A shows a table depicting a confusion matrix obtained by classification on a training data set according to one embodiment.

FIG. 5B shows a table depicting confusion matrix obtained by classification on a test data set according to one embodiment.

DETAILED DESCRIPTION

Figure 1:
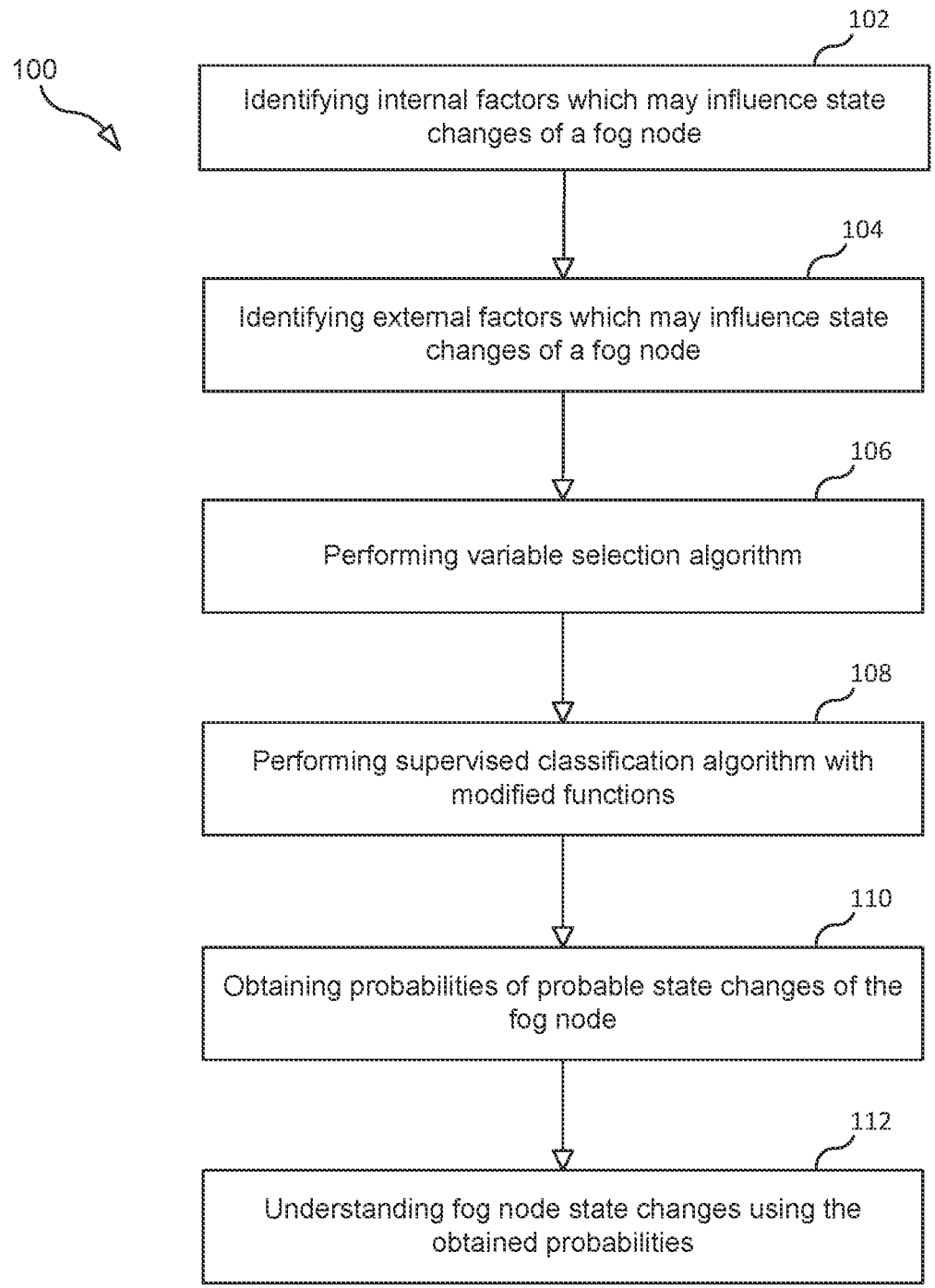
FIG. 1 is a flow chart illustrating a process according to one embodiment.

As used herein the indefinite articles "a" and "an" mean at least one.

As explained above, understanding fog node state change behaviors is more complex compared to a mobile phone churner or a financial churner due to the inherent characteristics of the fog network. Accordingly, the predictive algorithms used for the mobile phone churner or financial churner cannot be used for predicting probable fog node state changes. Hence, some aspects of the current disclosure provide a new method of predicting probable fog node state changes. Accordingly, some aspects of the current disclosure enables the continuous understanding (e.g., monitoring) of a current state of a fog node and facilitates predictive maintenance of the fog node. Some aspects of the current disclosure allow the avoidance of disruption in fog networks caused by a sudden change of a fog node to an inactive mode. A significant boost to industrial IoT applications may be provided by some aspects of the current disclosure.

The current disclosure represents this method of predicting probable fog node state changes as a binary classification problem. In some embodiments, the probabilities of node state changes are estimated by factoring internal and external variables. In some embodiments, the current approach may assume that each fog node is independent of each other.

In the proposed invention, according to some aspects of the current disclosure, sensors and actuators are connected in a network such that computation is partially shifted to an edge of the network. The ecosystem of the sensors and actuators is built in hierarchical fog architecture. In some instances, a fog node may be disconnected from the network due to some internal damage (e.g., internal variables such as power failure or computational issues) or due to change in external conditions (e.g., external variables such as wind, water current, etc.). Based on such internal and external variables, some embodiments of the invention may learn about the features in and surrounding the fog node that are affected when a state of the fog node changes to an inactive state.

The following innovative concepts are implemented as part of the proposed invention, according to some embodiments.

First, the probability of a fog node changing to an inactive state is considered as a rare event phenomena. As explained above, the probability of a fog node changing to an inactive state is less than 0.1%. Current algorithms for classification are accuracy driven, which results in the bias towards a majority class. In the proposed solution, the f-measure is used as the classification driven parameter to measure the test accuracy rather than simple accuracy to decrease the statistic bias of the classifier. The f-measure focuses mainly on precision and recall rather than accuracy. Precision is the ratio of how many fog nodes facing state changes truly moved to an inactive state compared to a total number of predicted state changes of the fog nodes. On other hand, recall is the ratio of how many fog nodes predicted to have state changes truly moved into an inactive state compared to a total number of true inactive fog nodes. As classification accuracy is not enough to evaluate the robustness of the model in the case of rare event sampling, the proposed solution uses the f-measure towards the test's accuracy measure.

Second, a new classification algorithm (e.g., a new learning model) with new features (since a fog node is a collection of many different sensors with unique functionalities) is employed where the f-measure is taken as a driving force rather than accuracy, which can be used in other classification algorithms where there are different minority classes.

Third, multi label classification is employed. More specifically, the entire probability scale of state change of the fog node may be divided into different blocks and a label may be assigned to each probability block to run a multi-class classification problem. Good accuracy can be obtained from this approach.

FIG. 1 is a flow chart illustrating a method 100 according to some embodiments that is performed by a network node in a network, to predict a probability of state change of a node (e.g. a fog node) in the network.

The method 100 may begin with step 102 in which the network node identifies internal factors which may influence the state changes of a fog node. For example, internal factors may include battery status, among others.

In step 104, external factors which may influence the state changes of the fog node are identified. In some embodiments, external factors which may influence the fog node to change to an inactive state or move out of its location may be identified. For example, external factors which may move the fog node out of its location may include climatic changes.

In step 106, a variable selection algorithm is performed to determine the important affecting variables factors (i.e. the internal and/or external factors) by considering the unique features of each sensor of the fog node.

In step 108, variables selected by the variable selection algorithm are passed onto a classifier, which divides them into categories. In the context of the current disclosure, the classifier refers to a mathematical function with a modified function that implements classification, i.e. maps the input variables to the different categories. In some embodiments, the modified function may be a softmax function. In such embodiments, the softmax function may be used to classify and estimate the probabilities of state change of the fog node.

In step 110, probabilities of probable state changes of the fog node are obtained as a result of the supervised classification algorithm.

In step 112, the obtained probabilities of the probable state changes are used to understand the fog node state changes. In some embodiments, the obtained probabilities may be used to make instantaneous decisions such as shifting the fog node computation to another node, etc.

In some embodiments, the proposed method 100 uses deep-learning networks to classify the fog nodes into different categories based on the obtained probabilities. For example, the fog nodes may be classified into different categories, such as, a fog node having a low risk of probable state change, a medium risk of probable state change, and a high risk of probable state change. As explained above, the classification is performed using the f-measure rather than the accuracy, because state change of a fog node is considered as a rare event phenomena.

The proposed method 100 will be explained in more detail in the following paragraphs.

The objective of the proposed method 100 is to estimate weights vector w such that a f-measure of a classifier is maximized since the state change of the fog node is a rare event phenomena. In order to achieve this objective, in some embodiments, the f-measure is parametrized in terms of weights and defined as follows:

$$f\text{-measure} = 2 * T_p(w) / N_p + M_p(w)$$

where $M_p(w)$ is a total number of samples predicted to be positive (e.g., predicted positive), $T_p(w)$ is number of actual positive samples out of the predicted positive, and $N_p$ is the total number of actual positive samples, and where a positive sample corresponds to the node in an operating state (e.g., y=1) and a negative sample corresponds to the node in a non-operating state (e.g., y=0).

In some embodiments, the expressions for $T_p(w)$ and $M_p(w)$ are parametrized in terms of an indicator function g(z) which is defined as:

$$g(z) = \begin{cases} 1 & z \geq 0 \\ 0 & z < 0 \end{cases},$$

where z is a real number.

However, the function g(.) is not continuous and thereby not differentiable. Hence, an approximation is applied to g(.). In this context of the disclosure, function g(.) is approximated by a function h(.) which is defined as:

$$h(z) = \begin{cases} 0 & z < -1 \\ 0.5(1+z)^2 & -1 \leq z \leq 0 \\ 0.5(2-(1-z)^2) & 0 < z \leq 1 \\ 1 & z > 1 \end{cases},$$

where z is a real number.

Figure 2:
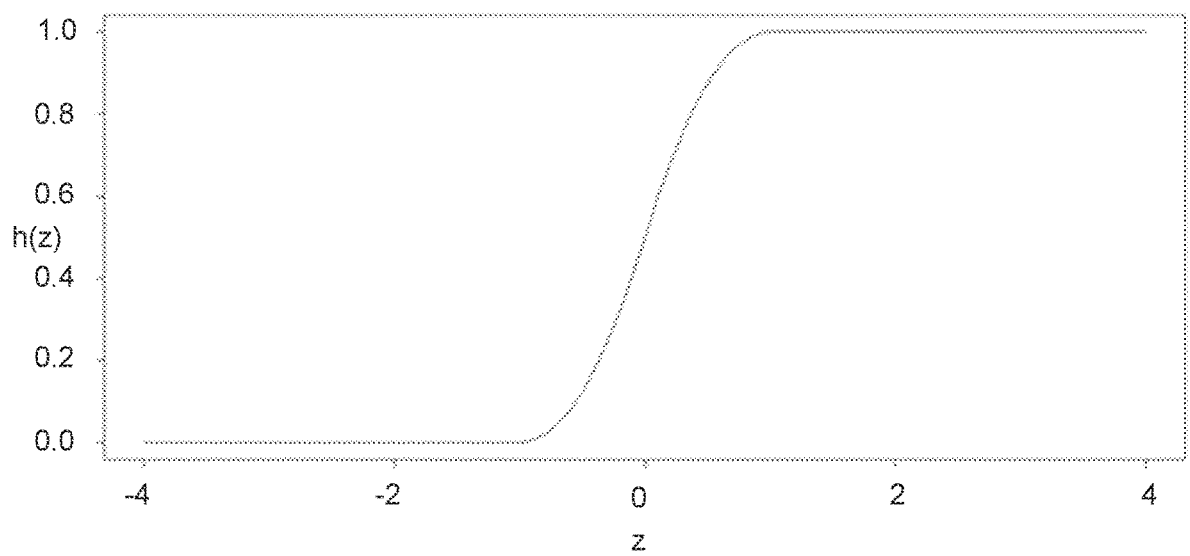
FIG. 2 shows a plot of a function according to one embodiment.

The function h(z) is continuous and differentiable. The approximated function h(z) may be plotted as shown in FIG. 2. As illustrated in FIG. 2, the plot 200 of h(z) resembles the indicator function in which the value is 0 for z<0 and 1 for z>=0.

Accordingly, the expressions for $T_p(w)$ and $M_p(w)$, based on the approximation function h(.), are defined as:

$$T_p(w) = \sum_{i=1, y_i=1}^{N} h(w^T x_i),$$

where $T_p(w)$ only considers the number of actual positive samples out of the predicted positive corresponding to the node in an operating state (e.g., $y_i=1$), and $$M_p(w) = \sum_{i=1}^{N} h(w^T x_i),$$

where $M_p(w)$ considers the number of actual positive samples out of the predicted positive corresponding to the node in an operating state, (e.g., $y_i=1$) and a number of negative samples out of the predicted positive corresponding to the node in an operating state, (e.g., $y_i=0$).

In some embodiments, the f-measure of the classifier may be maximized by calculating a derivative of the f-measure and computing the optimal weights. Using the computed optimal weights, classification is performed and the probabilities of state change of the fog node are estimated. For example, a softmax function can be used to perform the classification and estimate the probabilities of state change by using the computed optimal weights as inputs. An example of the softmax function is $$\frac{e^x}{1+e^x}.$$

The maximization and the classification may be performed efficiently if an analytical gradient is provided. For example, the f-measure may be maximized by calculating a derivative of the f-measure. In some embodiments, the derivative of the f-measure may comprise a derivative of the $T_p(w)$ and a derivative of the $M_p(w)$. The derivative of the $T_p(w)$ and the derivative of the $M_p(w)$ may be calculated as:

$$\frac{\partial T_p(w)}{\partial w_j} = \sum_{i=1, y=1}^{N} h'(w^T x) x_{ij}$$

$$\frac{\partial M_p(w)}{\partial w_j} = \sum_{i=1}^{N} h'(w^T x) x_{ij}$$

In some embodiments, the derivative of the f-measure may be obtained as:

$$\frac{\partial F(w)}{\partial w_j} = B \frac{\partial T_p(w)}{\partial w_j} - 0.5 B^2 T_p(w) \frac{\partial M_p(w)}{\partial w_j}, \text{ where}$$

$$B = \frac{2}{Np + Mp(w)}.$$

In some embodiments, the optimal weights may be obtained by maximizing the f-measure. In such embodiments, the f-measure may be maximized by equating the derivative of the f-measure to zero. Accordingly, using all of the equations above, the proposed method may be performed to obtain optimal weights.

In some embodiments, the obtained optimal weights may be used to obtain the probabilities of probable state changes of the fog node. In some embodiments, the obtained probabilities may be divided into three scales such as a low risk (0-0.3), a medium risk (0.31-0.7) and a high risk (0.71-1). In some embodiments, these three scales (e.g., the low, medium, and high risk) can be extended to more categories as required by the user. In some embodiments, the user (e.g., an operator) may be alerted about the state of the fog node based on the probabilities. For example, the fog network may be configured to alert the user when the obtained probability indicates a high risk (0.71-1.0) of state change of the fog node.

Figure 3:
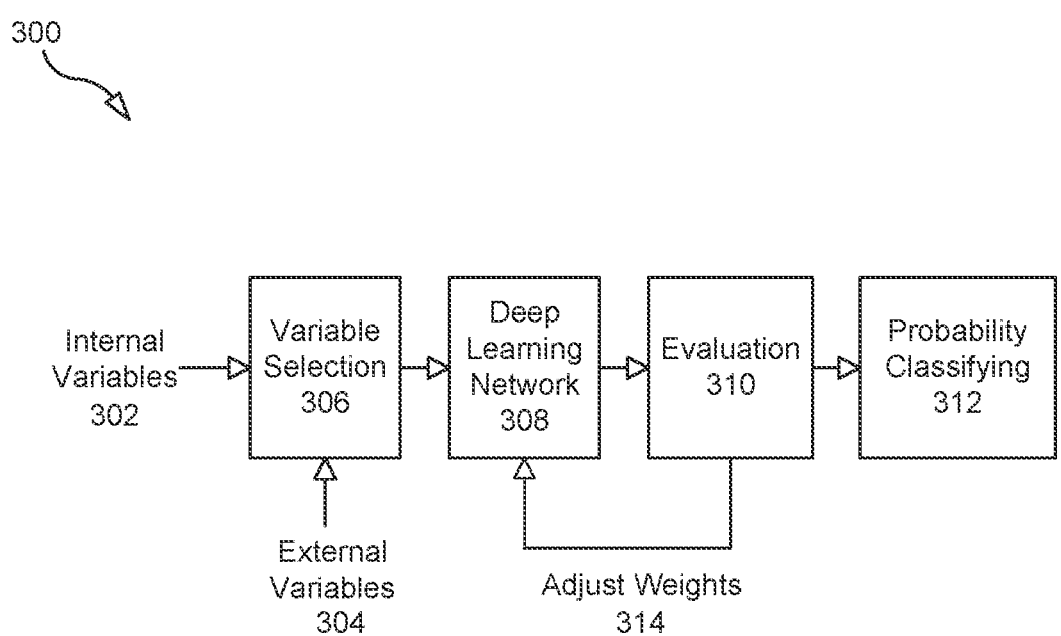
FIG. 3 is a flow chart illustrating a process according to one embodiment.

FIG. 3 is a flow chart illustrating a process 300 according to some embodiments, that is performed by a network node in a network, to predict a probability of state change of a node (e.g., a fog node) in the network.

Process 300 may begin with step 302 and 304 in which the network node receives internal variables and external variables affecting the node.

In step 306, the received internal variables and external variables are input into a variable selection algorithm to identify the important variables. That is, the variable selection algorithm is used to determine the important affecting factors by considering the unique features of each sensor of the node. In some embodiments, the variable selection algorithms may be a decision tree algorithm, a random forest algorithm, a support vector machine algorithm, and a least absolute shrinkage and selection operator (LASSO) algorithm.

In step 308, a deep learning model is constructed by determining the weights of the input variables based on the input variables and values obtained in step 306.

In step 310, the output of the deep learning model is evaluated and an evaluation value of the model is computed. In some embodiments, the evaluation value comprises a f-measure which is a property of a classifier. To compute the f-measure, a confusion matrix is constructed, as shown in the table below.

| Actual | Predicted Value | |
| --- | --- | --- |
| Value | Positive | Negative |
| Positive | True Positive (TP) | False Negative (FN) |
| Negative | False Positive (FP) | True Negative (TN) |

In some embodiments, a positive value may correspond to an active state of the node and a negative value may correspond to an inactive state of the node. In some embodiments, a true positive (TP) value is defined as a number of values predicted as positive which are positive in actual value. A true negative (TN) is defined as a number of values predicted as negative which are negative in actual value. A false negative (FN) is defined as a number of values predicted as negative which are positive in actual value. A false positive is defined as a number of values predicted as positive which are negative in actual value. For a good classifier, the values of the FN and the FP should be minimal especially in the cases of rare event phenomena. That is, in cases where a probability of inactive state (e.g., negative value) is very small, the value of FN should be very low when compared with the remaining values. Subsequently, the f-measure may be computed as:

$$\frac{2 * TP}{TP + FN} + TP + FP$$

Based on the evaluation value (f-measure) computed in step 310, the optimal weights are computed using the gradient descent approach by adjusting the weights in step 314 such that the evaluation value is maximized.

In step 312, the probability of the state change of the node is computed using the optimal weights computed in step 314.

A use case illustration of the proposed solution described above is described in the following paragraphs.

The proposed solution has tremendous application in many different fields. One such application of the proposed solution is for "buoys" which are installed by India's National Institute of Ocean Technology (NIOT) to monitor the sea characteristics. In most developed countries, buoys are used to monitor the movement of watercrafts. These buoys contain different sensors such as temperature, pressure, and current velocity, among others. Such sensors are self-sustained on battery power. These buoys transmit measured values from the sensors every fifteen minutes to the data center through satellite means. Based on this transmitted data, possible state change of the buoys may be predicted in advance of the actual state change so that an operator may take preventive or remedial measures in anticipation of the actual state change. For example, the operator may make active decisions regarding the buoy before it gets washed away or moves into an inactive state.

Figure 4:
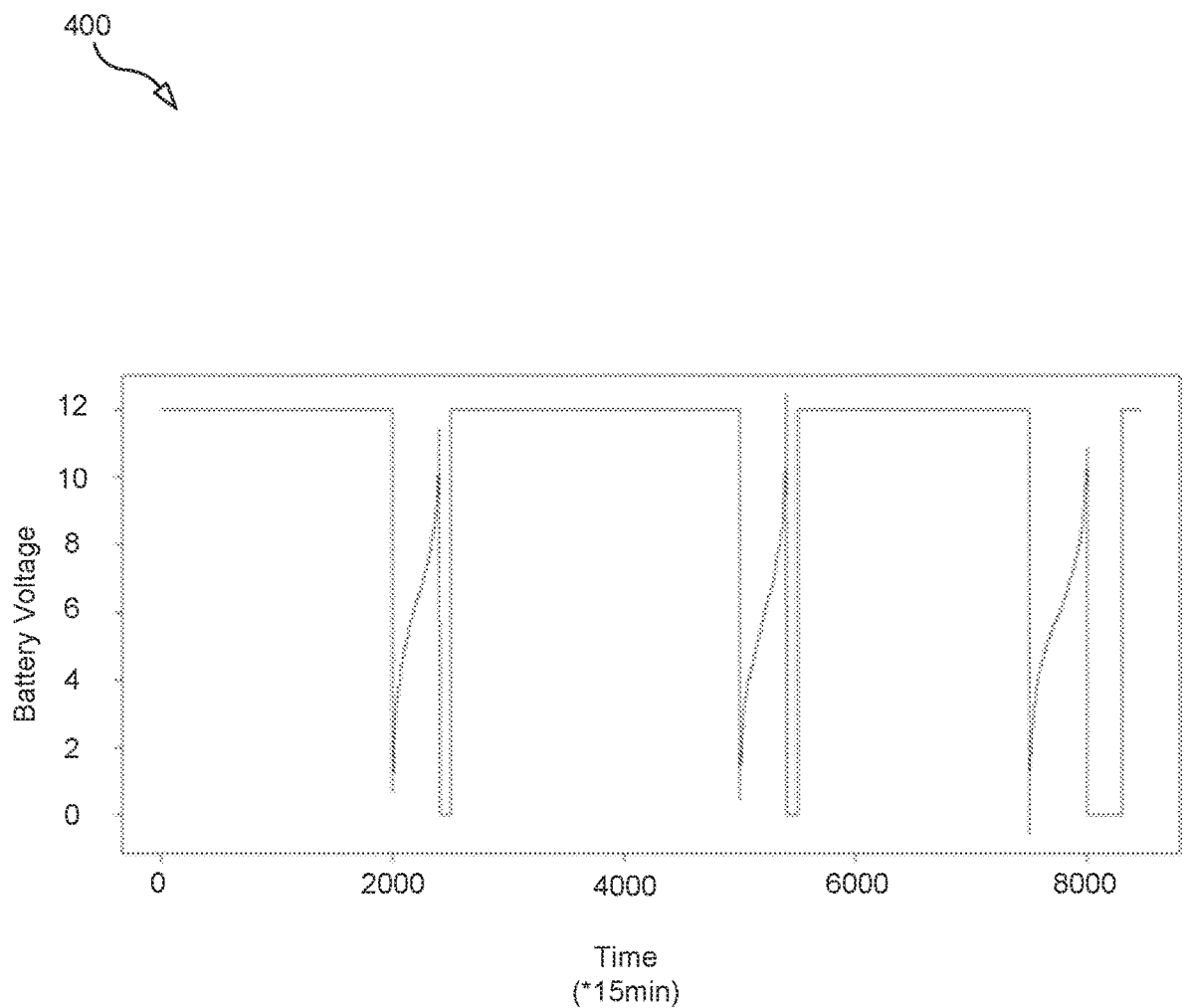
FIG. 4 shows a plot of battery voltage according to one embodiment.

In this example, data from a buoy located in Provincetown, Mass. is analyzed. The data transmitted by the buoy consists of four variables: (i) temperature, (ii) pressure, (iii) battery, and (iv) wave current velocity. For the purposes of testing the performance of the proposed solution, an artificial defect is added into the battery voltage data as shown in FIG. 4. FIG. 4 illustrates a plot of battery voltage for a buoy over time 400, according to some embodiments.

As shown in FIG. 4, the plot 400 indicates rapid battery voltage decrease during time intervals 2300-2500, 5300-5500 and 7800-8100 which suggests that there is a fault in the system. Similarly, another artificial defect is added into the wave current velocity data. This example describes a rare event problem where the percentage of the buoy changing to an inactive state is only 5% of the total data.

For better classification, the age of the buoy sensors are also taken into consideration in performing classification on the derived variable. For example, the derived variable may be defined as:

derived variable=sensor value/age of the sensor.

Using such derived variables allows the consideration of the age of the sensors. More specifically, this takes into account that as the sensor age increases, the probability of the sensor malfunctioning also increases. It should also be noted that the battery voltage is the critical and most important factor for the buoys. That is, if the battery fails, the entire fog node fails regardless of the sensors. Accordingly, high importance is allocated to the battery weight in determining optimal weights for the variables.

The above data (6,000 samples training and remaining samples testing) is classified using the proposed method performing classification by maximizing the f-measure. As described above in step 310 of FIG. 3, a confusion matrix is constructed based on a training dataset and shown as table 500A in FIG. 5A. As shown in table 500A, the true positive value (TP) is 161, the false negative value (FN) is 21, the false positive value (FP) is 39, and the true negative value (TN) is 5779. The proportion of values of FN and FP are minimal compared to the TP and TN, which indicates that a very small number of samples are misclassified. This suggests the efficacy of the proposed method in reducing the number of misclassified samples. Applying the parameters used in the training dataset on the test dataset, another confusion matrix is constructed and shown as table 500B in FIG. 5B. As shown in table 500B, the true positive value (TP) is 132, the false negative value (FN) is 83, the false positive value (FP) is 48, and the true negative value (TN) is 2206. The proportion of values of FN and FP are minimal compared to the TP and TN, which indicates that a very small number of samples are misclassified. Accordingly, it is evident from the values of the confusion matrix depicted in table 500B that only a small number of samples have been misclassified, again suggesting the efficacy of the proposed method when applied to the test dataset.

FIG. 5C depicts a table 500C illustrating a comparison of the proposed method of classification by maximizing the f-measure (e.g., the proposed method) with existing methods where the objective is to maximize accuracy. In general, the performance of a classifier is measured based on the area under the receiver operating characteristic (ROC) curve. Accordingly, if the area under the ROC curve is high, the classifier is deemed to have performed well. On the other hand, if the area under the ROC curve is low, the classifier is deemed to have underperformed. As shown in FIG. 5C, the area under the ROC curve on the test dataset is 0.93 (out of a range of 0-1.0). FIG. 5C also shows that the f-measure of the data using the proposed method is obtained as 0.85. For comparison purposes, the classification performed using traditional classification methods (e.g., existing method) result in an area under the ROC curve obtained as 0.63 and a f-measure obtained as 0.63, as shown in FIG. 5C. Accordingly, the higher area under the ROC curve obtained for the proposed method indicates better classification compared to traditional classification methods. Accordingly, it is quite evident that the proposed method classifies the data better compared to existing methods of classification where the data is a rare event phenomena.

Figure 6:
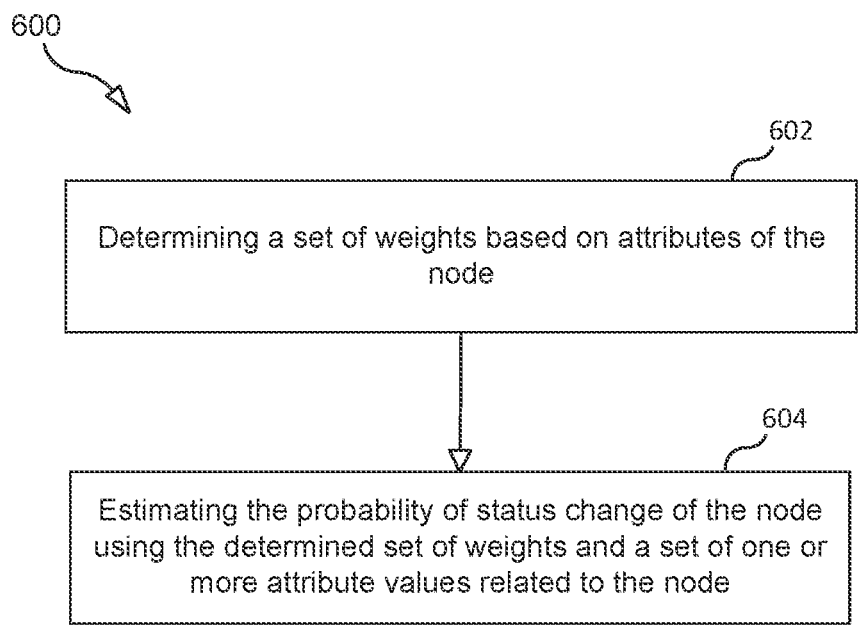
FIG. 6 is a flow chart illustrating a process according to one embodiment.

FIG. 6 is a flow chart illustrating a process 600 according to some embodiments, which is performed by a network node in a network, to predict a probability of state change of a node in the network.

Process 600 may begin with step 602 in which the network node determines a set of weights based on attributes of the node. In some embodiments, determining the set of weights may comprise maximizing an evaluation value associated to the node. In some embodiments, maximizing the evaluation value associated to the node may comprise maximizing a f-measure of a specific classifier.

In some embodiments, the f-measure is defined as:

$$f\text{-measure}=2*T_p(w)/N_p+M_p(w),$$

where $N_p$ is a total number of actual positive samples, $M_p(w)$ is a total number of samples predicted to be positive (e.g, predicted positive), and $T_p(w)$ is a number of actual positive samples out of the predicted positive, and where a positive sample corresponds to the node in an operating state (e.g., y=1) and a negative sample corresponds to the node in a non-operating state (e.g., y=0).

In some embodiments, $T_p(w)$ is defined as:

$$T_p(w) = \sum_{i=1}^{N} h(w^T x_i),$$

where $T_p(w)$ only considers the number of actual positive samples (e.g., $y_i=1$) out of the predicted positive.

In some embodiments, $M_p(w)$ is defined as:

$$M_p(w) = \sum_{i=1}^{N} h(w^T x_i),$$

where $M_p(w)$ considers the number of actual positive samples (e.g., $y_i=1$) out of the predicted positive and a number of negative samples (e.g., $y_i=0$) out of the predicted positive.

In some embodiments, the f-measure is maximized by calculating a derivative of the f-measure and equating the derivative of the f-measure to zero. The f-measure may be maximized by employing a gradient descent algorithm based on the derivative of the f-measure to determine the set of weights. In some embodiments, the derivative of the f-measure may comprise a derivative of the $T_p(w)$ and a derivative of the $M_p(w)$.

In some embodiments, the derivative of the $T_p(w)$ is defined as:

$$\frac{\partial T_p(w)}{\partial w_j} = \sum_{i=1, y=1}^{N} h'\left(\sum_i w_i x_i\right) x_{i,j}.$$

In some embodiments, the derivative of the $M_p(w)$ is defined as:

$$\frac{\partial M_p(w)}{\partial w_j} = \sum_{i=1}^{N} h'\left(\sum_i w_i x_i\right) x_{i,j}.$$

In some embodiments, the function h(z) is defined as:

$$h(z) = \begin{cases} 0 & z < -1 \\ 0.5(1+z)^2 & -1 \leq z \leq 0 \\ 0.5(2-(1-z)^2) & 0 < z \leq 1 \\ 1 & z > 1 \end{cases},$$

where z is a real number.

In step 604, the network node estimates the probability of state change of the node using the determined set of weights and a set of one or more attribute values related to the node. In some embodiments, using the determined set of weights and the set of one or more attribute values comprises applying each weight of the determined set of weights to a corresponding attribute value of the set of one or more attribute values.

In some embodiments, the process 600 may have an additional step where the network node determines the set of one or more attribute values based on a first set of one or more internal attribute values and a second set of one or more external attribute values. In some embodiments, the set of one or more attribute values may be determined by the network node obtaining the first set of one or more internal attribute values and the second set of one or more external attribute values; employing an attribute selection algorithm based on the received first set of one or more internal attribute values and the second set of one or more external attribute values; and determining the set of one or more attribute values based on the attribute selection algorithm. In some embodiments, the attribute selection algorithm is a least one of a decision tree algorithm, a random forest algorithm, a support vector machine algorithm, and a least absolute shrinkage and selection operator (LASSO) algorithm.

In some embodiments, the process 600 may have an additional step where the network node determines a plurality of probability levels for the predicted probability of state change of the node. In some embodiments, a first probability level indicates a low risk of state change of the node, a second probability level indicates a medium risk of state change of the node, and a third probability level indicates a high risk of state change of the node.

In some embodiments, the node may be a fog node. In some embodiments, a prediction model may be used to predict the probability of state change of the node. In some embodiments, the prediction model to predict the probability of state change of the node is built using deep learning neural network.

Figure 7:
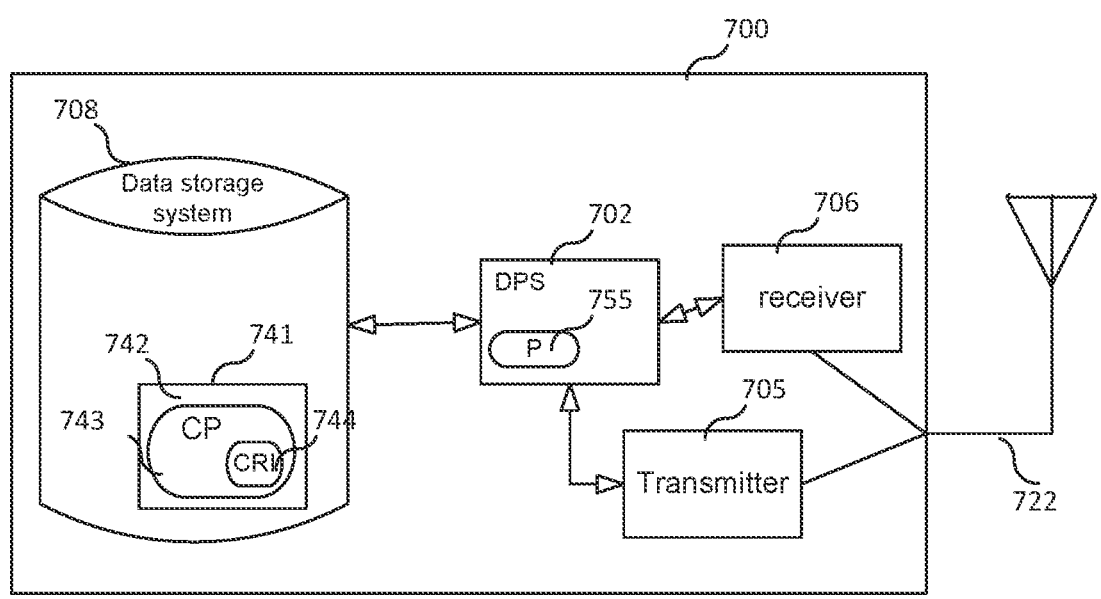
FIG. 7 is a block diagram of a network node according to some embodiments.

FIG. 7 is a block diagram of a node (e.g., network node, fog node) 700 according to some embodiments. As shown in FIG. 7, the node may comprise: a data processing system (DPS) 702, which may include one or more processors 755 (e.g., a general purpose microprocessor and/or one or more other processors, such as an application specific integrated circuit (ASIC), field-programmable gate arrays (FPGAs), and the like); a radio transmitter 705 and a radio receiver 706 coupled to an antenna 722 for use in wireless communication; and local storage unit (a.k.a., "data storage system") 712, which may include one or more non-volatile storage devices and/or one or more volatile storage devices (e.g., random access memory (RAM)). In embodiments where the node includes a general purpose microprocessor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, but not limited, to magnetic media (e.g., a hard disk), optical media (e.g., a DVD), memory devices (e.g., random access memory, flash memory, etc.), and the like. In some embodiments, the CRI 744 of computer program 743 is configured such that when executed by data processing system 702, the CRI causes the node to perform steps described above (e.g., steps described above with reference to the flow charts). In other embodiments, the node may be configured to perform steps described herein without the need for code. That is, for example, data processing system 702 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for predicting a probability of state change of a first node in a network, the method being performed in a network node, the method comprising:

obtaining a set of one or more attribute values related to the first node;

determining a set of one or more weights based on attributes of the first node;

obtaining a set of one or more weighted attribute values, wherein said one or more weighted attribute values are obtained using the determined set of one or more weights and the obtained set of one or more attribute values; and estimating the probability of state change of the first node using the set of one or more weighted attribute values, wherein determining the set of one or more weights comprises determining one or more weights that maximize an evaluation value associated to the first node, and the determined one or more weights that maximize the evaluation value are included in the determined set of one or more weights, wherein a prediction model is used to estimate the probability of state change of the first node, and said one or more weighted attribute values are inputs of the prediction model.

2. The method of claim 1, wherein the first node comprises a fog node.

3. The method of claim 1, wherein maximizing the evaluation value associated to the first node comprises:

maximizing an f-measure of a specific classifier.

4. The method of claim 3, wherein the f-measure is defined as:

$$f\text{-measure}=2*T_p(w)/N_p+M_p(w),$$

wherein $N_p$ is a total number of actual positive samples, $M_p(w)$ is a total number of samples predicted to be positive, and $T_p(w)$ is a number of actual positive samples out of the samples that are predicted to be positive, and wherein a positive sample corresponds to the first node in an operating state and a negative sample corresponds to the first node in a non-operating state.

5. The method of claim 4, wherein $T_p(w)$ is defined as:

$$T_p(w) = \sum_{i=1}^{N} h(w^T x_i),$$

where $T_p(w)$ only considers the number of actual positive samples out of the samples that are predicted to be positive,
wherein $M_p(w)$ is defined as:

$$M_p(w) = \sum_{i=1}^{N} h(w^T x_i),$$

where $M_p(w)$ considers the number of actual positive samples out of the samples that are predicted to be positive and a number of negative samples out of the samples that are predicted to be positive.

6. The method of claim 5, wherein maximizing the f-measure comprises calculating a derivative of the f-measure and equating the derivative of the f-measure to zero.

7. The method of claim 6, wherein maximizing the f-measure further comprises:
employing a gradient descent algorithm based on the derivative of the f-measure to determine the set of weights.

8. The method of claim 6, wherein the derivative of the f-measure comprises:
(i) a derivative of the $T_p(w)$ defined as:

$$\frac{\partial T_p(w)}{\partial w_j} = \sum_{i=1, y=1}^{N} h'\left(\sum_i w_i x_i\right) x_{ij},$$

and
(ii) a derivative of the $M_p(w)$ is defined as:

$$\frac{\partial M_p(w)}{\partial w_j} = \sum_{i=1}^{N} h'\left(\sum_i w_i x_i\right) x_{ij}.$$

9. The method of claim 5, wherein the function h(z) is defined as:

$$h(z) = \begin{cases} 0 & z < -1 \\ 0.5(1+z)^2 & -1 \leq z \leq 0 \\ 0.5(2-(1-z)^2) & 0 < z \leq 1 \\ 1 & z > 1 \end{cases},$$

where z is a real number.

10. The method of claim 1, wherein using the determined set of one or more weights and the set of one or more attribute values comprises applying each weight of the determined set of one or more weights to a corresponding attribute value of the set of one or more attribute values.

11. The method of claim 1, the method further comprises:
determining the set of one or more attribute values based on a first set of one or more internal attribute values and a second set of one or more external attribute values.

12. The method of claim 11, wherein determining the set of one or more attribute values comprises:
obtaining the first set of one or more internal attribute values and the second set of one or more external attribute values;
employing an attribute selection algorithm based on the first set of one or more internal attribute values and the second set of one or more external attribute values; and
determining the set of one or more attribute values based on the attribute selection algorithm.

13. The method of claim 12, wherein the attribute selection algorithm is at least one of a decision tree algorithm, a random forest algorithm, a support vector machine algorithm, or a least absolute shrinkage and selection operator (LASSO) algorithm.

14. The method of claim 1, wherein the prediction model to estimate the probability of state change of the first node is built using deep learning neural network.

15. The method of claim 1, the method further comprising:
determining a plurality of probability levels for the estimated probability of state change of the first node.

16. The method of claim 15, wherein a first probability level indicates a low risk of state change of the first node, a second probability level indicates a medium risk of state change of the first node, and a third probability level indicates a high risk of state change of the first node.

17. The method of claim 1, wherein the probability of state change of the first node is estimated using two or more weighted attribute values.

18. A computer program product comprising a non-transitory computer readable medium storing a computer program comprising instructions which when executed by processing circuitry of a network node causes the network node to:
obtain a set of one or more attribute values related to a first node;
determine a set of one or more weights based on attributes of the first node by performing a process that comprises determining one or more weights that maximize an evaluation value associated to the first node;
obtain a set of one or more weighted attribute values, wherein said one or more weighted attribute values are obtained using the determined set of one or more weights and the obtained set of one or more attribute values; and
estimate the probability of state change of the first node using the set of one or more weighted attribute values, wherein
the determined one or more weights that maximize the evaluation value are included in the determined set of one or more weights, wherein
a prediction model is used to estimate the probability of state change of the first node, and
said one or more weighted attribute values are inputs of the prediction model.

19. A network node, the network node comprising:
processing circuitry; and
a memory, said memory containing instructions executable by said processing circuitry, whereby said network node is operative to:
obtain a set of one or more attribute values related to a first node;
determine a set of one or more weights based on attributes of the first node by performing a process that comprises determining one or more weights that maximize an evaluation value associated to the first node;

obtain a set of one or more weighted attribute values, wherein said one or more weighted attribute values are obtained using the determined set of one or more weights and the set of one or more attribute values; and estimate the probability of state change of the first node using the set of one or more weighted attribute values related to the first node, wherein the determined one or more weights that maximize the evaluation value are included in the determined set of one or more weights, wherein a prediction model is used to estimate the probability of state change of the first node, and said one or more weighted attribute values are inputs of the prediction model.

\* \* \* \* \*